United States Patent
Kao

(10) Patent No.: US 6,594,450 B1
(45) Date of Patent: Jul. 15, 2003

(54) CAMERA AUTO-FOCUS MECHANISM

(75) Inventor: Chun-Tien Kao, Shen-Ken Hsiang (TW)

(73) Assignee: Primax Electronics Ltd., Taipei Hsien (TW)

( * ) Notice: Subject to any disclaimer, the term of this patent is extended or adjusted under 35 U.S.C. 154(b) by 0 days.

(21) Appl. No.: 10/248,446

(22) Filed: Jan. 21, 2003

(51) Int. Cl.$^7$ ............................... G03B 3/10; G02B 7/04
(52) U.S. Cl. ........................................ 396/133; 359/824
(58) Field of Search ......................... 396/133; 359/823, 359/824

(56) References Cited

U.S. PATENT DOCUMENTS 6,424,472 B1 * 7/2002 Chen ...................... 359/824 X

* cited by examiner

*Primary Examiner*—W. B. Perkey
(74) *Attorney, Agent, or Firm*—Winston Hsu

(57) ABSTRACT

A camera auto-focus mechanism includes a frame having a first hollow cylinder. A second hollow cylinder including metal material is fit over the first cylinder and capable of moving relative to the first cylinder. A first lens is fixed to the frame, and a second lens is fixed inside the second cylinder, both lenses being axially aligned with the cylinders. An insulated conductive metal coil is wound around the first cylinder, and a spring joins the second cylinder and the first cylinder. When current is not applied to the coil, the second cylinder is held in a first position by the spring such that the first and second lenses form a first focal length. And, when current is applied to the coil, the second cylinder is held in a second position against a force of the spring such that the first and second lenses form a second focal length.

18 Claims, 5 Drawing Sheets

CAMERA AUTO-FOCUS MECHANISM

BACKGROUND OF INVENTION

1. Field of the Invention

The present invention relates to a camera, and more specifically, to a camera auto-focus mechanism.

2. Description of the Prior Art

Most automatic cameras include a device for automatically focusing a subject to be photographed. An auto-focus device does not require the user to manually bring the subject into focus, thereby reducing focusing errors and making modern automatic cameras easy to use.

A typical auto-focus device is controlled by a microcontroller to control the relative position of a pair of lenses. The microcontroller also coordinates other devices to perform an active range finding function (e.g. infrared) or a passive range finding function. Once the range of the subject from the camera is determined the microcontroller controls the auto-focus device to position the lenses to correctly focus the subject.

Cost effective automatic cameras usually employ a two-position lens system where the lens system is set to either a far-focus or a near-focus position. A simplified range finding system provides ranging information to a microcontroller that controls the two positional lens system. Focus is then automatically established based on the subject being at infinity or at a normal subject distance of about 8–12 feet (2.4–3.6 meters).

Conventional auto-focus mechanisms, which are currently used in cameras, do not use space economically and have overly complicated linkage mechanisms and other unnecessary components. An improved auto-focusing mechanism is required to reduce size, weight, and costs of modern automatic cameras.

SUMMARY OF INVENTION

It is therefore a primary objective of the claimed invention to provide a space-saving and cost effective two-position camera auto-focus mechanism to solve the above problems.

Briefly summarized, an embodiment of the claimed invention includes a frame having a first hollow cylinder having a circular opening, a first lens fixed to the frame and axially aligned with the circular opening, an insulated conductive metal coil wound around the first cylinder, a second hollow cylinder including metal material fitting over the first cylinder and capable of moving relative to the first cylinder along a central axis, a second lens fixed inside the second cylinder and axially aligned with the circular opening, and an elastic member, such as a spring axially aligned with the circular opening, joining the second cylinder and the first cylinder. When electrical current is not applied to the coil, the second cylinder is held in a first position by the elastic member such that the first and second lenses form a first focal length. And, when electrical current is applied to the coil, the second cylinder is held in a second position against a force of the elastic member such that the first and second lenses form a second focal length.

According to another embodiment of the claimed invention, the positions of the coil and the metal material are exchanged.

It is an advantage of the claimed invention that the coil and the metal in the second cylinder form a solenoid-type actuator thereby providing actuation and structure with the same components.

It is a further advantage of the claimed invention that the coaxial arrangement of the cylinders, lenses, metal material, and spring provides a space-economic arrangement.

It is a further advantage of the claimed invention that the energized coil draws the second cylinder to the second position against the elastic member, and the elastic member acts to return the second cylinder to the first position when the coil is not conducting current so that the auto-focus mechanism can be easily used in any orientation.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
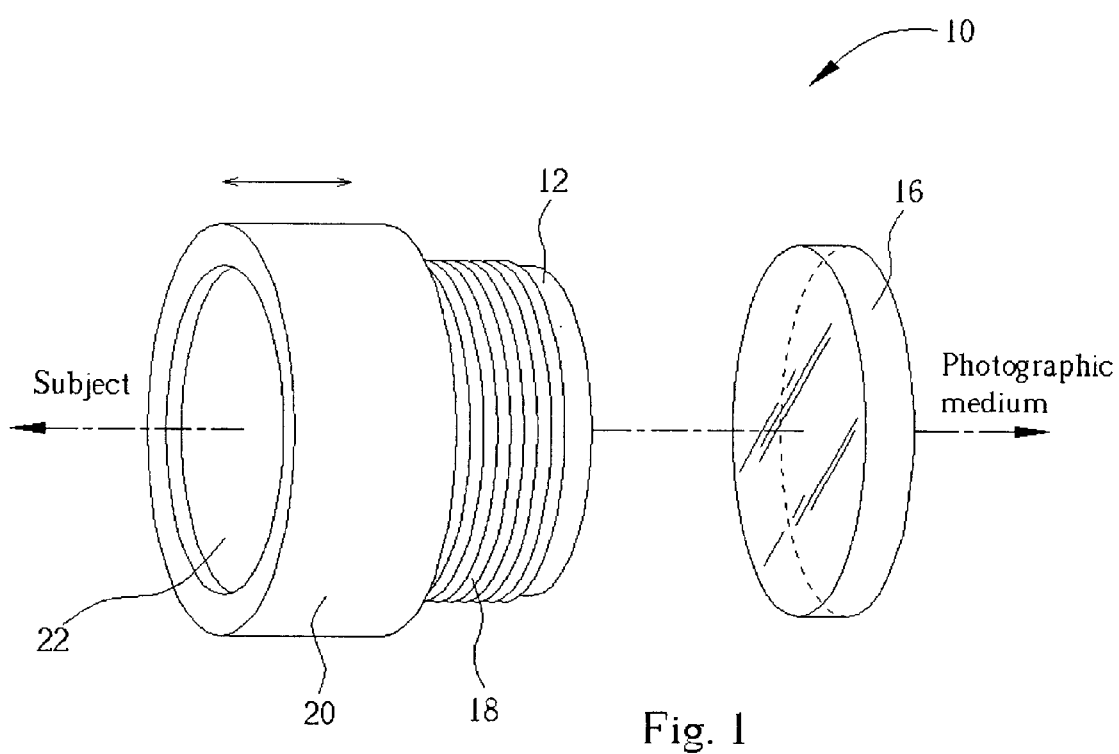
FIG. 1 is a perspective view of an auto-focus mechanism according to the claimed invention.

Please refer to FIG. 1 showing a perspective view of an auto-focus mechanism 10 according to the present invention. The auto-focus mechanism 10 includes a first hollow cylinder 12 attached to a frame (ref. 14, FIG. 2a), a first lens 16 also attached to the frame, an insulated metal wire wound around the cylinder 12 forming a coil 18, and a second hollow cylinder 20 holding a second lens 22. The second cylinder 20 fits over the first cylinder 12 and the coil 18 and is movable along the central axis of the first cylinder 12. The first and second lenses 16, 22 are also aligned on the central axis of the first cylinder 12. The first and second cylinders 12, 20 are mechanically connected by an elastic member such as a spring (ref. 24, FIG. 2a). The second cylinder 20 is made of metal, preferably a metal with high magnetic permeability such as iron, or magnetized iron or other permanent magnet material. The coil 18 is a linear coil of insulated conductor capable of being energized by a power source (not shown) to conduct a current. The coil 18 and second cylinder 20 form a solenoid-type device (e.g. electromagnetic valve). The auto-focus mechanism 10 is installed in a camera such as a film-based or digital camera. The first and second lenses 16, 22 work in conjunction to focus light from a subject to be photographed onto a photographic medium such as a photographic film or a charge-coupled device (CCD), the distance between the first and second lenses 16, 22 determining the focal length of the auto-focus mechanism 10.

Figure 2A:
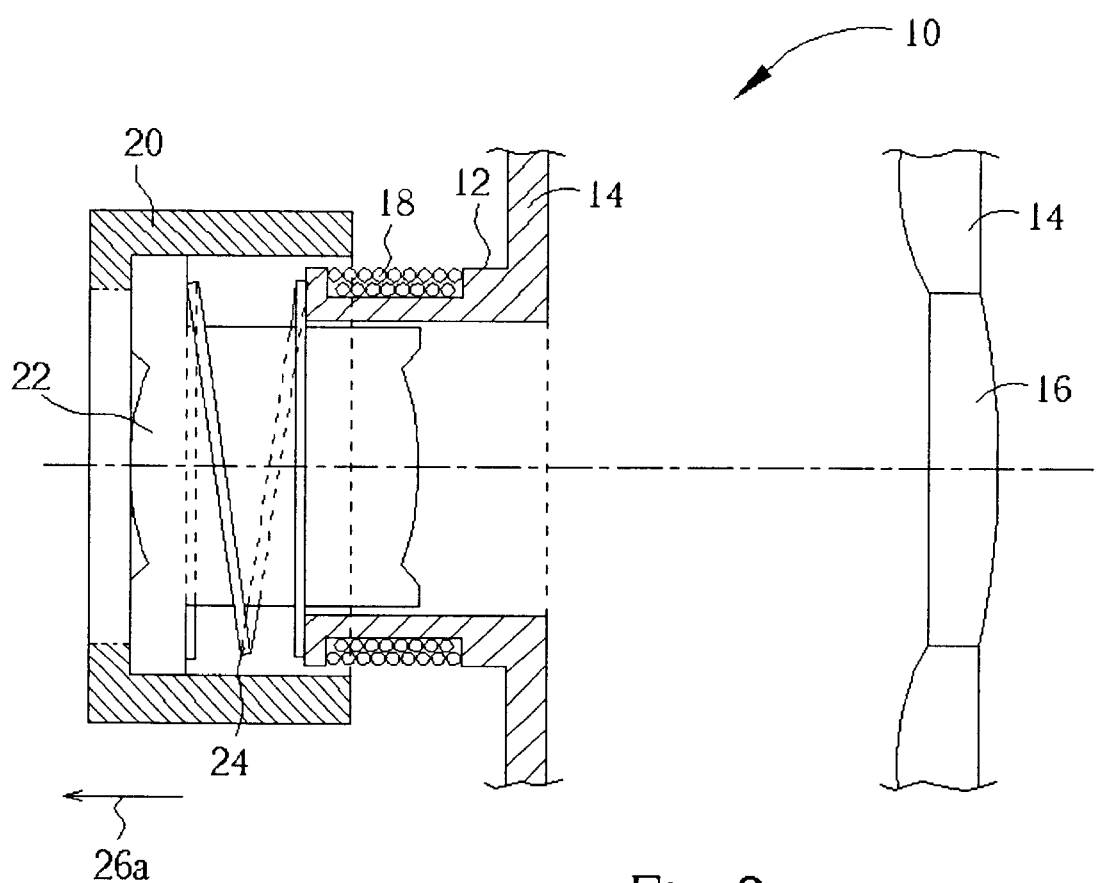
FIG. 2a is a cross-sectional view of an auto-focus mechanism according to a first embodiment of the present invention.

Referring to FIG. 2a, a cross-sectional view of the auto-focus mechanism 10 is illustrated. Visible in the cross-sectional view is the spring 24. The spring 24 is a coil spring that tends to push the second cylinder 20 and the connected second lens 22 in a direction indicated by arrow 26a away from the first cylinder 12. The second cylinder 20 is prevented from decoupling from the first cylinder 12 by a stop or similar device attached to the first cylinder 12 or the frame 14, this being well known in the art and not illustrated in FIG. 2a. When the coil 18 is not energized, the auto-focus mechanism 10 is in the position as shown in FIG. 2a, which sets the lenses 16, 22 to a focal length for focusing distant subjects.

Figure 2B:
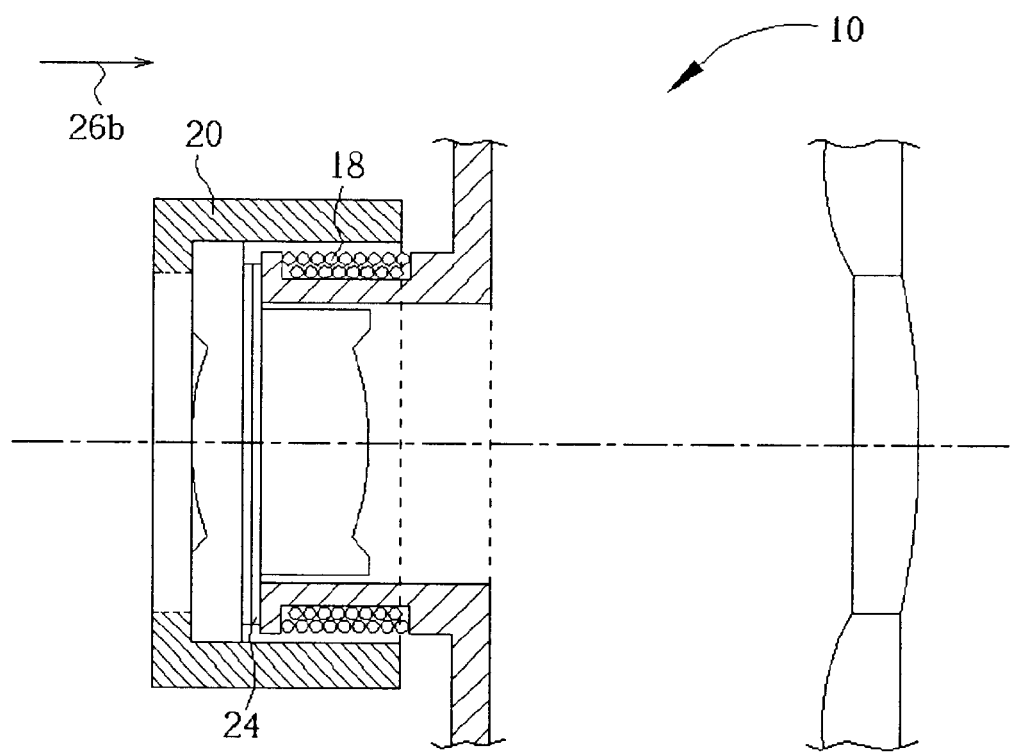
FIG. 2b is a cross-sectional view of the auto-focus mechanism of FIG. 2a in a near focus position.

Referring to FIG. 2b, when the coil 18 conducts electrical current, the second cylinder 20, being metal, is drawn towards the coil 18 compressing the spring 24 indicated by the direction of arrow 26b. The current applied to the coil 18 to accomplish this depends on parameters such as the specific magnetic permeability of the material of the second cylinder 20, the number of windings of the coil 18, and the mechanical properties of the spring 24. These properties along with the overall dimensions of the auto-focus mechanism 10 can be selected by a designer to meet precise design requirements for a particular camera. Alternatively, the spring 24 could be a flat spring serving the same function as a coil spring. The auto-focus mechanism 10 as illustrated in FIG. 2b produces a focal length for focusing subjects near the camera.

Figure 3:
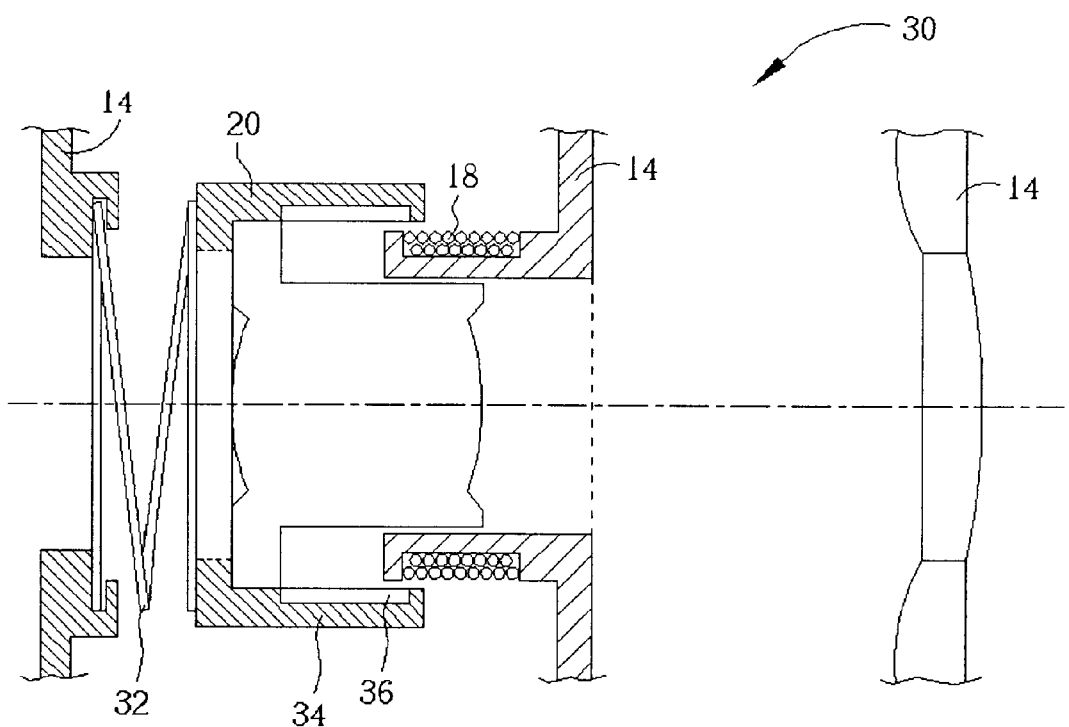
FIG. 3 is a cross-sectional view of an auto-focus mechanism according to a second embodiment of the present invention.

FIG. 3 illustrates a cross-sectional view of a second embodiment of the present invention. An auto-focus mechanism 30 includes a spring 32 replacing the spring 24 of the first embodiment. The main difference being that the spring 32 is connected to the frame 14 so that the spring 32 tends to keep a plastic second cylinder 34 (the spring 32 being outside the second cylinder 34) in a position away from the coil 18 when the coil 18 is not conducting current. The plastic second cylinder 34 includes a recessed cylindrical metal component 36 for forming a solenoid-type actuator with the coil 18. When the coil 18 is energized, the second cylinder 34 moves as in the first embodiment, and the spring 32 is consequently elongated storing energy to return the second cylinder 34 to its initial position when the coil 18 is de-energized. In this way, the auto-focus mechanism 30 according to the second embodiment can produce two distinct focal lengths.

Figure 4:
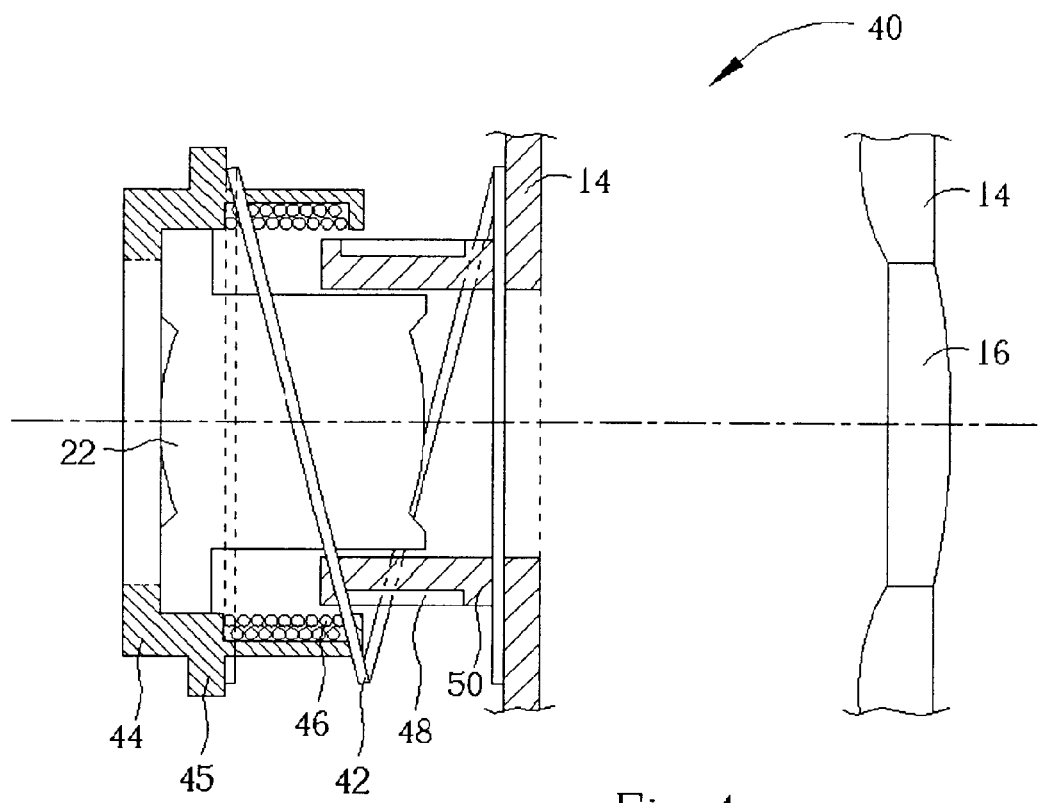
FIG. 4 is a cross-sectional view of an auto-focus mechanism according to a third embodiment of the present invention.

FIG. 4 illustrates a cross-sectional view of a third embodiment of the present invention. An auto-focus mechanism 40 includes a spring 42 replacing the spring 24 of the first embodiment. The spring 42 is connected to the frame 14 so that the spring 42 tends to keep a plastic second cylinder 44 having a raised lip 45 in a position away from a first cylinder 50 when a coil 46 installed on the second cylinder 44 is not conducting current. The raised lip 45 provides a contact surface for the spring 42, serving the same purpose as the inside lip of the second cylinder 20 in the first embodiment. The first cylinder 50 includes a recessed metal cylinder 48 for forming a solenoid-type actuator with the coil 46. When the coil 46 is energized and conducts current, the second cylinder 44 and the attached second lens 22 move to a position nearer the first lens 16 as in the first and second embodiments.

Generally, the lens structure illustrated does not limit the present invention auto-focus mechanism. That is, the first and second lenses can be replaced by single or multiple lenses as required by a particular camera design.

In contrast to the prior art, the present invention the present invention auto-focus mechanism employs a solenoid-type electromagnetic actuator counterbalanced by a mechanical spring to provide two distinct focal lengths to a camera. Actuation and lens supporting structure is thus accomplished with the same components, the total component quantity of the auto-focus mechanism being reduced. The coaxial arrangement of the cylinders, lenses, metal material, and spring provides a compact arrangement. The present invention auto-focus mechanism can be easily used in any physical orientation and in any number of modern cameras.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A camera auto-focus mechanism comprising:
    a frame comprising a first cylinder, the first cylinder being hollow having a circular opening;
    a first lens fixed to the frame and axially aligned with the circular opening;
    a coil of insulated wire wound around the first cylinder, the coil capable of conducting electrical current;
    a second hollow cylinder fitting over the first cylinder and capable of moving relative to the first cylinder along a central axis, the second cylinder comprising metal;
    a second lens fixed inside the second cylinder and axially aligned with the circular opening; and
    an elastic member joining the second cylinder and the first cylinder;
    wherein when the coil is not conducting current, the second cylinder is held in a first position by the elastic member such that the first and second lenses form a first focal length; and when the coil is conducting current, the second cylinder is held in a second position against a force of the elastic member such that the first and second lenses form a second focal length.

2. The camera auto-focus mechanism of claim 1 wherein the second cylinder comprises an inner lip.

3. The camera auto-focus mechanism of claim 2 wherein the elastic member is a coil spring axially aligned with the circular opening contacting an edge of the first cylinder and the inner lip of the second cylinder.

4. The camera auto-focus mechanism of claim 2 wherein the elastic member is a flat spring axially aligned with the circular opening contacting an edge of the first cylinder and the inner lip of the second cylinder.

5. The camera auto-focus mechanism of claim 1 wherein the elastic member is a coil spring axially aligned with the circular opening and aligned with the second cylinder contacting an edge of the second cylinder, the spring being attached to the first cylinder through the frame.

6. The camera auto-focus mechanism of claim 1 wherein the elastic member is a coil spring coiled around the second cylinder and attached to an outside lip of the second cylinder, the spring being attached to the first cylinder through the frame.

7. The camera auto-focus mechanism of claim 1 wherein the second cylinder is made of iron or magnetized iron.

8. The camera auto-focus mechanism of claim 1 wherein the second cylinder comprises a hollow metal cylinder recessed into an inside surface of the second cylinder.

9. A camera including the camera auto-focus mechanism of claim 1.

10. A camera auto-focus mechanism comprising:
    a frame comprising a first cylinder, the first cylinder being hollow having a circular opening, the first cylinder comprising metal;
    a first lens fixed to the frame and axially aligned with the circular opening;
    a second hollow cylinder fitting over the first cylinder and capable of moving relative to the first cylinder along a central axis;

a coil of insulated wire wound around the second cylinder, the coil capable of conducting electrical current;

a second lens fixed inside the second cylinder and axially aligned with the circular opening; and an elastic member joining the second cylinder and the first cylinder;

wherein when the coil is not conducting current, the second cylinder is held in a first position by the elastic member such that the first and second lenses form a first focal length; and when the coil is conducting current, the second cylinder is held in a second position against a force of the elastic member such that the first and second lenses form a second focal length.

11. The camera auto-focus mechanism of claim 10 wherein the second cylinder comprises an inner lip.

12. The camera auto-focus mechanism of claim 11 wherein the elastic member is a coil spring axially aligned with the circular opening contacting an edge of the first cylinder and the inner lip of the second cylinder.

13. The camera auto-focus mechanism of claim 11 wherein the elastic member is a flat spring axially aligned with the circular opening contacting an edge of the first cylinder and the inner lip of the second cylinder.

14. The camera auto-focus mechanism of claim 10 wherein the elastic member is a coil spring axially aligned with the circular opening and aligned with the second cylinder contacting an edge of the second cylinder, the spring being attached to the first cylinder through the frame.

15. The camera auto-focus mechanism of claim 10 wherein the elastic member is a coil spring coiled around the second cylinder and attached to an outside lip of the second cylinder, the spring being attached to the first cylinder through the frame.

16. The camera auto-focus mechanism of claim 10 wherein the first cylinder is made of iron or magnetized iron.

17. The camera auto-focus mechanism of claim 10 wherein the first cylinder comprises a hollow metal cylinder recessed into an outside surface of the first cylinder.

18. A camera including the camera auto-focus mechanism of claim 10.

* * * * *